United States Patent [19]
Kunz

[11] 3,883,870
[45] May 13, 1975

[54] SYSTEM FOR PHASE ALIGNING PARALLEL SIGNAL PROCESSING CHANNELS

[75] Inventor: William J. Kunz, Torrance, Calif.

[73] Assignee: Hughes Aircraft Company, Culver City, Calif.

[22] Filed: Dec. 17, 1973

[21] Appl. No.: 426,289

[52] U.S. Cl. .............................. 343/17.7; 343/16 M
[51] Int. Cl. ............................................... G01s 7/40
[58] Field of Search ....................... 343/16 M, 17.7

[56] References Cited
UNITED STATES PATENTS

| | | | |
|---|---|---|---|
| 2,955,199 | 10/1960 | Mindes | 343/117 A |
| 2,975,275 | 3/1961 | Adams | 343/117 A |
| 3,048,782 | 8/1962 | Altman | 343/117 A |
| 3,229,289 | 1/1966 | Stine | 343/17.7 |
| 3,243,815 | 3/1966 | Dynan et al. | 343/17.7 |
| 3,353,180 | 11/1967 | Anderson | 343/16 M |
| 3,534,285 | 10/1970 | Kobold et al. | 331/1 A |
| 3,745,577 | 7/1973 | Goldmacher | 343/16 M |

Primary Examiner—Malcolm F. Hubler
Attorney, Agent, or Firm—W. H. MacAllister; Lawrence V. Link, Jr.

[57] ABSTRACT

A system for automatically phase aligning parallel signal processing channels such as those used in the receiving system of monopulse radars, for example. Test signals having a predetermined phase relationship are applied at the inputs of each of two signal processing channels and a phase detector measures the phase of the resulting output signals. The phase detector's output signal is processed to control a variable phase shifter, series coupled with the local oscillator signal applied to a mixer in one of these channels, so as to cause the test signals at the output of the two processing channels to have a predetermined phase relationship.

4 Claims, 5 Drawing Figures

Phase Detector 28

SYSTEM FOR PHASE ALIGNING PARALLEL SIGNAL PROCESSING CHANNELS

The invention claimed herein was made in the course of or under a contract with the United States Air Force.

BACKGROUND OF THE INVENTION

This invention relates generally to systems for phase aligning parallel signal processing channels and is particularly adapted to phase aligning the antenna-receiver subassembly of monopulse radars.

In applications in which information is transmitted by means of the phase between signals applied through parallel processing channels it is necessary to maintain a predetermined relationship between the relative electrical length of the processing channels. For example, in monopulse radar systems received microwaves signals are fed to two waveguide runs at the antenna and the phase relationship of these signals must be maintained at the output of the receiver.

Prior art approaches to parallel channel phase alignment generally require changing the channel line lengths mechanically such as by manually adjusting waveguide trombones or by the insertion of waveguide shims. However, such prior art techniques are not suitable to compensate for phase errors, such as those caused by temperature variations or changes in the operating frequency, occurring during operation of certain systems, such as airborne radars, for example. Hence a system which provides for automatic and continuous phase alignment would be a significant contribution to the art.

SUMMARY OF THE INVENTION

It is therefore a primary object of the subject invention to provide an improved system for phase aligning signal processing channels.

A further object is to provide for the automatic and continuous phase alignment of parallel channel processing systems.

A still further object is to provide a system which is adaptable to maintaining the phase alignment of processing channels such as those used in monopulse radars.

In accordance with one embodiment of the subject invention test signals having a predetermined phase relationship are applied at the input of each of two signal processing channels and a phase detector measures the phase of the resulting output signals. The output signal from the phase detector is converted into a binary "phase sense" signal indicative of whether the phase between the output signals of the processing channels is greater or less than a preselected value. The binary phase sense signal controls the counting direction of an up/down counter which increments the phase shift value of a digital phase shifter. The phase shifter is coupled in series with a local oscillator signal applied to a mixer in one of the processing channels and a similar mixer in the other processing channel receives the local oscillator signal which had not been phase shifted. Hence, the relative phase of the output signals from the two processing channels is a function of the setting of the phase shifter. As the phase between the output signals of the processing channels passes through the preselected phase value the binary phase sense signal changes states causing the up/down counter to change its counting direction and the phase shifter to be incremented in the opposite direction. Each time the phase shifter is "switched" so as to cause the preselected phase value between the output signals of the processing channels to be crossed, the direction of the phase shift incrementing is changed. Hence once the preselected phase value is crossed the system would tend to switch between the two phase shifter settings which encompassed this phase value. However, a second counter counts the state changes of the binary phase sense signal and after a preselected number of such changes the end of the alignment procedure is signaled; the application of the test signal is inhibited; and the phase shifter is "locked" at the setting which most closely produces the correct phase alignment of the signal processing channels.

BRIEF DESCRIPTION OF THE DRAWINGS

Other objects, features and advantages of this invention will become apparent from the following detailed description and the accompanying drawings wherein like reference numbers refer to like or similar parts and in which.

DETAILED DESCRIPTION OF THE DRAWINGS

Figure 1:
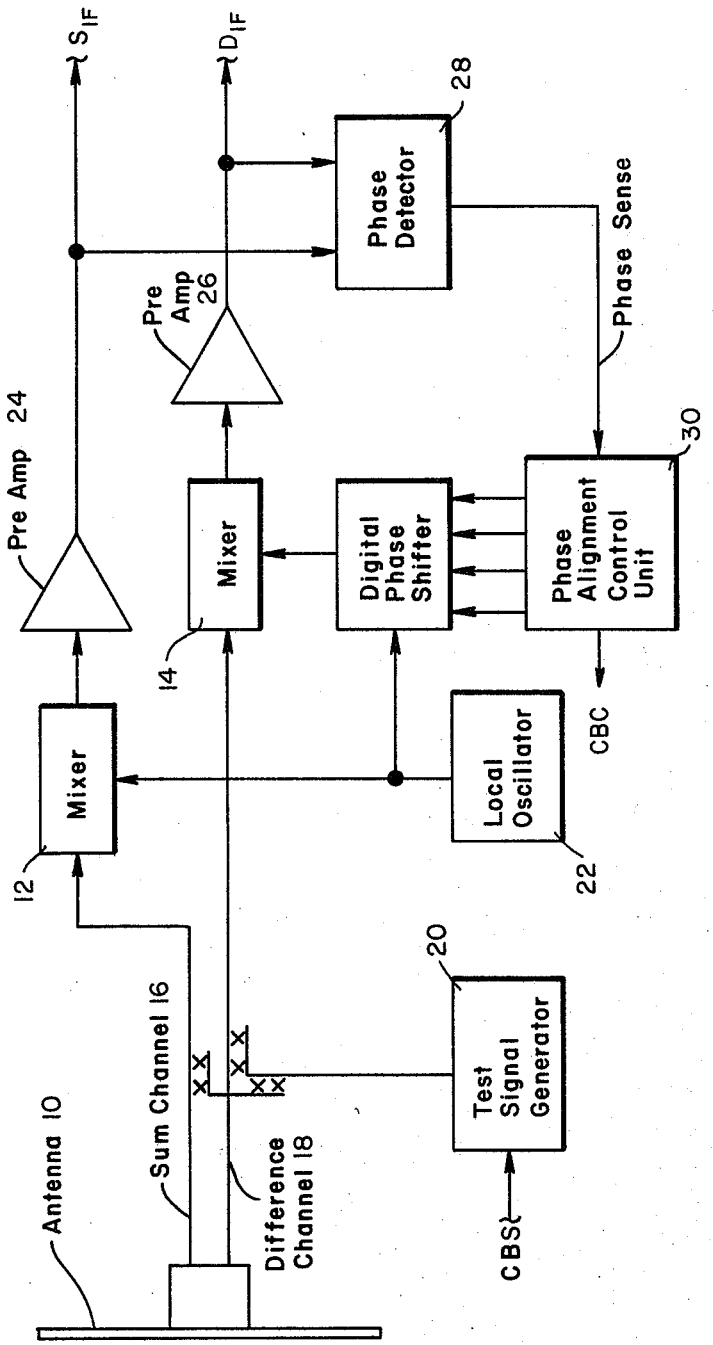
FIG. 1 is a block diagram of a system for phase aligning parallel signal processing channels in accordance with the subject invention.

FIG. 1 shows an embodiment of the subject invention which is implemented to phase align the sum and difference channels of a monopulse radar system. As there shown, the sum and difference channels between an antenna 10 and mixers 12 and 14 comprise waveguide sections 16 and 18 respectively. A test signal generator 20, when enabled by a "channel balance start" (CBS) signal, provides a microwave output signal which is coupled to the sum and difference channels such that the phase difference between these applied test signals is a preselected value, such as 90°, for example. The channel balance signal may be provided by the radar system's central control unit (not shown), for example. The channel balance signal may be provided by the radar system's central control unit (not shown), for example.

The microwave test signals in the sum and difference channels are "down converted" to the intermediate frequency range within mixers 12 and 14, respectively. The output signal of a local oscillator 22 is coupled directly to mixer 12 and this output signal is also coupled through a digital phase shifter 24 to mixer 14.

The intermediate frequency sum and difference signals from mixers 12 and 14 are amplified in preamplifiers 24 and 26, respectively, and are then applied to a phase detector 28. The output signal from phase detector 28 is a binary "phase sense" signal which is indicative of whether the phase between the two input signals ($S_{IF}$ and $D_{IF}$) to the phase detector is greater or less than a preselected value. The binary phase sense signal from detector 28 is processed within a phase alignment control unit 30 which in response thereto controls the setting of digital phase shifter 24 such that the desired phase relationship between the $S_{IF}$ and $D_{IF}$ signals is obtained. This relationship is indicated by a channel balance complete (CBC) signal which is applied to the radar system's control unit (not shown). In response to the channel balance complete signal the radar system's control unit terminates the channel balance start signal which enables generator 20.

Figure 2:
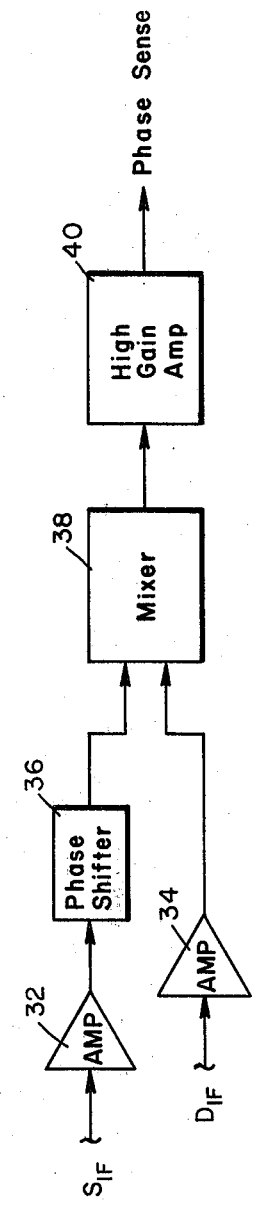
FIG. 2 is a block diagram of a phase detector suitable for use in the system of FIG. 2.

Phase detector 28 is shown in greater detail in FIG. 2 as comprising amplifiers 32 and 34, a phase shifter 36, a mixer 38 and a high gain amplifier 40. The amplifier $S_{IF}$ signal is phase shifted in unit 36 by a predetermined number of degrees so as to reduce the system's phase error resulting from the finite resolution of digital phase shifter 24, i.e., the correct phase shift setting may be between discrete phase values available from phase shifter 24. As will be explained more fully hereinafter, phase shifter 36 functions to reduce the quantization type error to approximately one-half the phase increment between the discrete settings of phase shifter 24.

Figure 5:
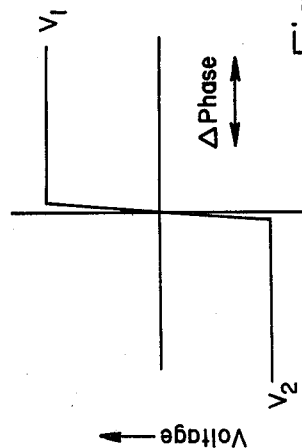
FIGS. 4 and 5 are diagrams of voltage versus phase which are useful for understanding the operation of the phase detector of FIG. 2.
Figure 4:
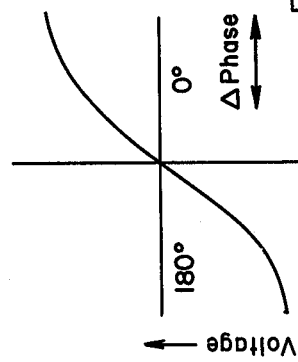

In the configuration of FIG. 2, mixer 38 functions as a cosine type phase detector and has an output voltage versus phase transfer characteristic such as shown in FIG. 4. High gain, saturation type, amplifier 40 converts the output signal of mixer 38 into a binary type signal; and FIG. 5 shows the output voltage versus phase transfer characteristic for the combination of mixer 38 and amplifier 40. For example, if the signals applied to mixer 38 are less than 90° out of phase the phase sense output signal from amplifier 40 will be at a first voltage level ($V_1$) and if they are more than 90° out of phase the phase sense signal will be at a second voltage level ($V_2$).

Amplifiers 32 and 34 are preferably of the "limiting" type which provide an output signal having a substantially constant amplitude level regardless of (within predetermined ranges) variations in the amplitude of the signals $S_{IF}$ and $D_{IF}$. In this way the output signal from mixer 38 is substantially independent of the amplitudes of the signals applied to the phase detector. Also, it is preferable that amplifiers 32 and 34 apply substantially the same phase shift to signals processed therethrough.

Figure 3:
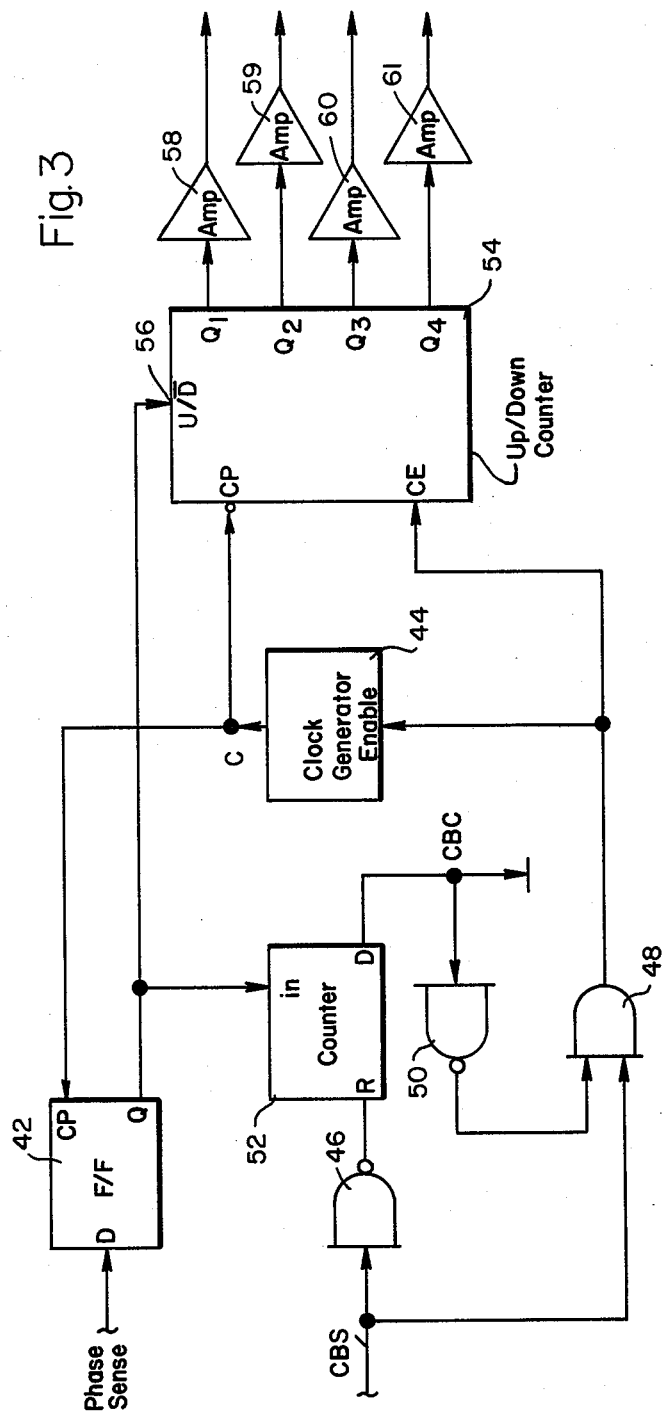
FIG. 3 is a block diagram of a phase alignment control unit suitable for use in the system of FIG. 1.

Phase alignment control unit 30 is shown in greater detail in FIG. 3 to which reference is now primarily directed. The binary phase sense signal from phase detector 28 (FIG. 1) is applied to the data (D) input terminal of a flip-flop (F/F) 42 and during the leading portion of the next applied clock pulse the "Q" output of the flip-flop assumes the same state as the "D" input. Clock pulses (C) are applied to flip-flop 42 from a clock generator 44 which may have a 10 khz rate, for example.

The channel balance start (CBS) signal from the radar system's control unit (not shown) is applied in parallel to an inverter 46 and to an AND gate 48; and the second input to AND gate 48 is applied thereto through an inverter 50 from the "D" output of a counter 52. In the illustrated embodiment of the invention the channel balance signal is true during the phase alignment operation of the system (the channel balance period) and just prior to this time counter 52 is held at reset by the false channel balance signal applied to inverter 46. Counter 52 is mechanized such that the "D" output is true at a preselected count such as "four," for example, and at the start of the channel balance period when the counter is reset its "D" output is false. The "D" output from counter 52 is inverted within unit 50 and during the channel balance period an enable signal is applied to clock generator 44 and up/down counter 54 from AND gate 48.

Counter 54 increments one count at the trailing edge of each clock pulse and the direction of the counting, i.e., up or down, is dependent on the binary state of the signal applied to terminal 56 of the up/down counter. The output stages "$Q_1$" through "$Q_4$" of counter 54 are coupled through amplifiers 58 through 61, respectively, to digital phase shifter 24 (FIG. 1).

In the operation of the subject invention in response to the channel balance start signal test generator 20 produces a microwave output signal which is applied to the sum and difference channels in such a manner that these applied signals are 90° out of phase. The test signals are down converted within mixers 12 and 14 and applied through amplifiers 24 and 26 to phase detectors 28. Depending upon the direction of the phase unbalance in the processing channel, the phase sense signal from detector 28 will be "true or false" and will cause up/down counter 54 (FIG. 3) to count up or down, respectively. Irrespective of the direction of the count, counter 54 will "count around" until it controls digital phase shifter 24 such that the relative phase of the signals from the sum and difference channels passes through the predetermined phase value. As the relative phase of the processed signals pass through this predetermined value the phase sense signal from detector 28 changes states causing counter 54 (FIG. 3) to count in the opposite direction. However, now one count in the opposite direction will again cause the relative phase of the processed signals ($S_{IF}$ and $D_{IF}$) to pass through the correct phase value (from the opposite direction) and so the phase sense signal will again change states; counter 54 will change its counting direction; and the just described sequence will repeat.

Each time the phase sense signal changes to the true state counter 52 is incremented and after four such counts its "D" output signal switches to the true state. The output signal from counter 52 is applied through inverter 50 and AND gate 48 so as to inhibit the operation of clock generator 44 and up/down counter 54. Also, the output signal from counter 52 is applied to the radar system's control unit (not shown) as a channel balance complete (CBC) signal and in response thereto the control unit causes the channel balance start (CBS) signals to test generator 20, inverter 46 and AND gate 48 to go false and thereby terminate the channel balance alignment sequence.

It should be noted that since counter 52 increments when the phase sense signal goes true, that the alignment procedure is always terminated with a phase error in a predetermined direction. For example, if it is assumed that phase shifter 24 is a "four bit" type device having phase increments of 22½° then it could be predicted that the phase error at the end of the alignment procedure would be in a given direction and from 0° to 22½° in magnitude. However, phase shifter 36 of detector 28 (FIG. 2) adds a 10¼°, for example, phase offset and as a result the alignment phase error of the system will be within 10¼° on either side of the desired phase value. To phrase this point differently, if the test signals applied to waveguide sections 16 and 18 are 90° out of phase, the system of FIG. 1 will adjust the phase of the local oscillator signal to mixer 14 such that the $S_{IF}$ and $D_{IF}$ signals are 90° ± 10¼° out of phase.

Although but a single embodiment of the subject invention has been described in detail, it will be apparent to those skilled in the art that many variations thereto may be made within the scope of the subject invention. For example, the number of stages comprising counter 54 and the resolution of digital phase shifter 24 may be selected so as to provide any desired degree of alignment accuracy; or phase detector 28, phase alignment control unit 30 and phase shifter 24 may be replaced by their analog equivalents. In such an analog embodiment, high gain amplifier 40 and phase shifter 36 (FIG. 2) may be deleted and phase alignment control unit 30 would function to control the analog phase shifter and provide the channel balance complete signal at the time the output signal from mixer 38 is sensed to be less than a predetermined magnitude. In its simplest form control unit 30 might include a type "one" servosystem which integrates the phase sense signal and drives the analog phase shifter in a first or second direction until the resultant channel phase alignment produces a null of the phase sense signal.

Thus having described a novel and improved system for phase aligning signal processing channels, what is claimed is:

1. A system for automatically phase aligning two signal processing channels of the type which includes a mixer for frequency translation and a local oscillator coupled to the mixer in each processing channel; said system comprising:

test generator means for applying test signals, having a preselected phase relationship, to the input section of each processing channel;

phase detector means coupled to the output section of each said processing channel for providing a binary phase sense signal indicative of whether the phase between the channels' output signals is more or less than a preselected value;

a digitally controllable phase shifter coupled between the local oscillator and the mixer of one of said signal processing channels; and control means coupled to said phase shifter and responsive to said phase sense signal, for controlling the phase shift of the local oscillator's output signal applied through said phase shifter so as to cause a preselected phase relationship between the output signals from said two processing channels; said control means including an up/down counter, first logic means for causing said counter to count up when said binary phase sense signal is of one state and to count down when said binary phase sense signal is of the other state, and second logic means for sensing the change of states of said binary phase sense signal and for inhibiting counting by said up/down counter after a preselected number of said binary signal state changes have been sensed; and means for applying the output signals from said up/down counter to said phase shifter so that the phase shift applied to the local oscillator's output signal by said phase shifter is controlled as a function of the count held in said up/down counter.

2. The system of claim 1 wherein said second logic means includes means for providing a channel balance complete output signal after said preselected number of binary signals state changes has been sensed, whereby said channel balance complete output signal is indicative of the completion of the phase alignment of the two signal processing channels.

3. A system for automatically phase aligning parallel signal processing channels of the type used in the antenna-receiver subassembly of monopulse radars wherein each channel includes a mixer operatively coupled to a source of local oscillator signals so that signals applied through the processing channels are translated in frequency, said system comprising:

test generator means for applying test signals to the input sections of said processing channels such that there is a preselected phase between the applied test signals;

a digitally controllable phase shifter coupled in series with the local oscillator signal applied to the mixer in one of said processing channels;

phase detector means coupled to the output section of each said processing channel for providing a binary phase sense signal indicative of whether the phase between the channels' output signals is more or less than a preselected value;

control means coupled between said phase detector means and said digitally controllable phase shifter for controlling the phase shifter as a function of said binary phase sense signal, said control means including an up/down counter, first logic means for causing said counter to count up when said binary phase sense signal is of one state and to count down when said binary phase sense signal is of the other state, and second logic means for sensing the change of states of said binary phase sense signal and for inhibiting counting of said up/down counter after a preselected number of said binary signal state changes has been sensed, and means for applying the output signals from said up/down counter to said digital phase shifter so that the phase shift applied to the local oscillator's output signal by said digital phase shifter, is controlled as a function of the count of said up/down counter.

4. The system of claim 3 wherein said second logic means includes means for providing a channel balance complete output signal after said preselected number of state changes of the binary phase sense signal has been sensed, whereby said channel balance complete output signal is indicative of the completion of the phase alignment of the two signal processing channels.

* * * * *